Figure 1:
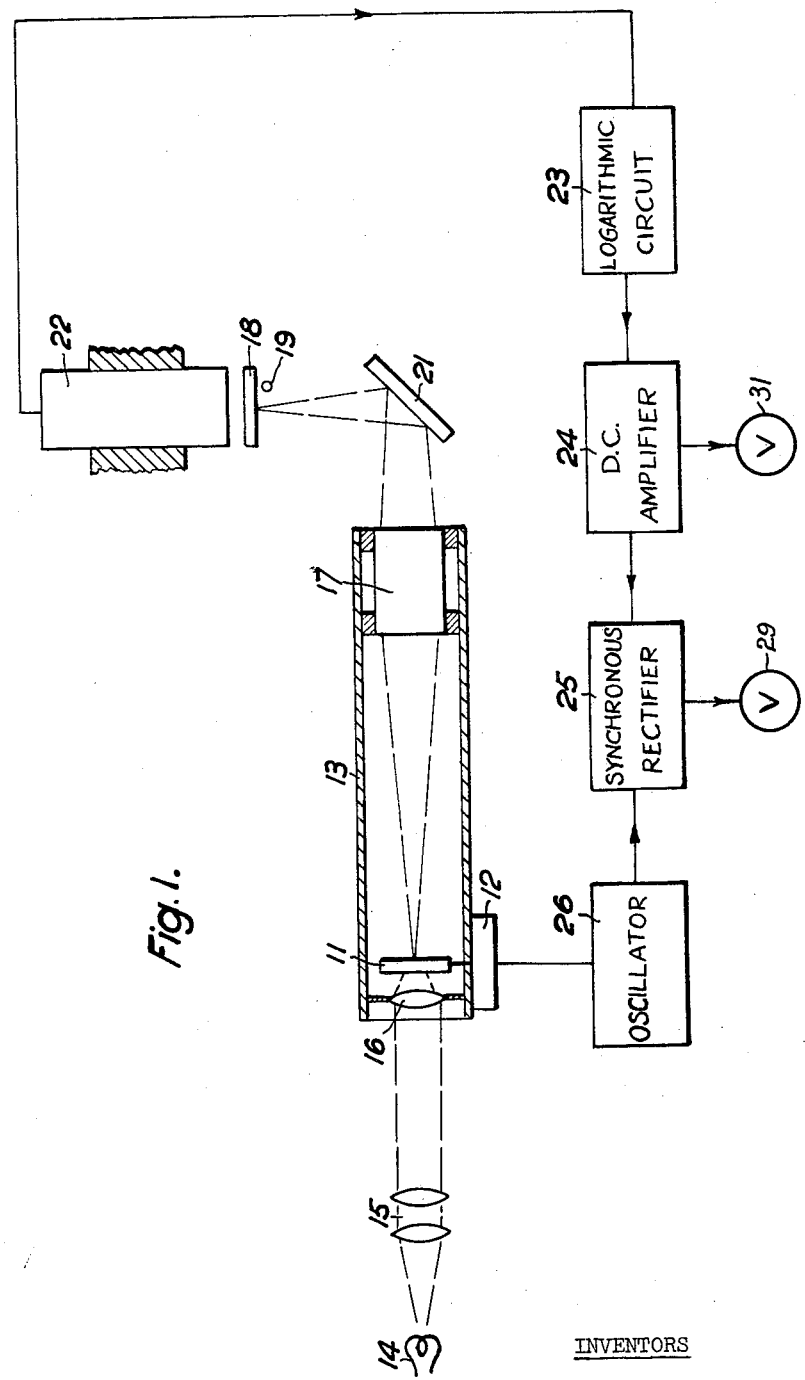

INVENTORS
ALAN HUGH COOK
ROBERT GEORGE HITCHINS
BY Larson and Taylor

3,053,987
EXPLORING PHOTOGRAPHIC DENSITIES
Alan Hugh Cook, Hampton, and Robert George Hitchins, Teddington, England
Filed Sept. 2, 1959, Ser. No. 837,683
Claims priority, application Great Britain Sept. 3, 1958
3 Claims. (Cl. 250—219)

It has been found that examination of standards of length by visual observation of their terminal lines or graduations through a micrometer microscope results in significant uncertainties. Examination of a photograph of the standard yields more precise results. But it is not easy to find the middle of the band of varying density (dark against a light background or vice versa) which in a photograph represents a graduation of the standard. One method of doing so is to halve the distance between two points of equal density on opposite sides of the strip of maximum or minimum density; but it has been found that the position of the middle line so found is dependent on the exposure and the time of development and maybe other factors. It has further been found that the position of the line, generally parallel with the image of the graduation, across which the rate of variation of density of the image is a maximum, is substantially independent of the factors above mentioned; and, moreover, the maximum is very sharp, that is to say the rate of variation of density (in the direction transverse to the image) falls steeply on each side of the maximum.

These observations are applicable, mutatis mutandis, to other photographs than those of standards of length, for example to photographs of interference fringes, and therefore wherever measurement upon a photograph is required the method of determining it by ascertaining where the density gradient is greatest may be of value. The density gradient may also be used to discover the line of maximum or minimum density since the gradient will there be zero, and to examine other characteristics of the image.

This invention therefore provides a method and an instrument by which the density gradient of a photographic image may be measured, and the position of the maximum or zero gradient and hence the position of maximum or minimum density be ascertained.

The gist of the invention, so far as the method of measurement is concerned, consists in projecting a narrow beam of light upon a photographic image of a line, receiving light from the image upon a photo-electric cell, oscillating the beam transversely to the image with an amplitude that is small compared with the width of the image, measuring the alternating current resulting from the excitation of the photo-electric cell, and relatively traversing the beam and the image slowly in relation to the speed of oscillation—the relative motion may be steady or step by step additional to the oscillatory motion—to ascertain the density gradient of the image at various points and thereby find the position of maximum or zero gradient and hence if desired the position of maximum or minimum density, one of which serves as an indication of the position of the line.

The invention provides an instrument for the purpose in view which comprises means for projecting a narrow beam of light upon the image, a photoelectric cell located to receive light from the image, means for oscillating the beam in relation to the image with an amplitude that is small compared with the width of the image, means for measuring the alternating current output of the cell and means for relatively traversing the beam and the image at a speed which is slow in relation to the oscillatory motion. In general the photograph will be on a transparent rigid carrier such as glass and the light received by the photo cell will be light transmitted through the image. In many cases the photograph will be a negative, for example, a negative photograph of a standard of length and it will be convenient to describe the invention by reference to such a photograph since it may then be taken that the photographic image is a linear band varying in density across its width from maximum to minimum and back to maximum.

To increase the sphere of usefulness of the instrument it may be made to show density as well as density gradient.

The readings of the instrument will be affected by the wave form of the oscillation imposed on the beam of light; but providing the amplitude of oscillation is small quite widely different wave forms, such as a sine wave and a square wave, will give more accurate results than could be got from direct micrometer readings.

It is not essential physically to oscillate the beam of light; it may be split in two by a double mirror and the two parts alternately obscured by a rotating shutter, but this requires very careful adjustment of the optical system.

However, in the form of instrument at present preferred the beam is made to oscillate. The instrument may be usefully combined with a compound microscope, and can well be built upon a tool-maker's microscope.

Figure 2:
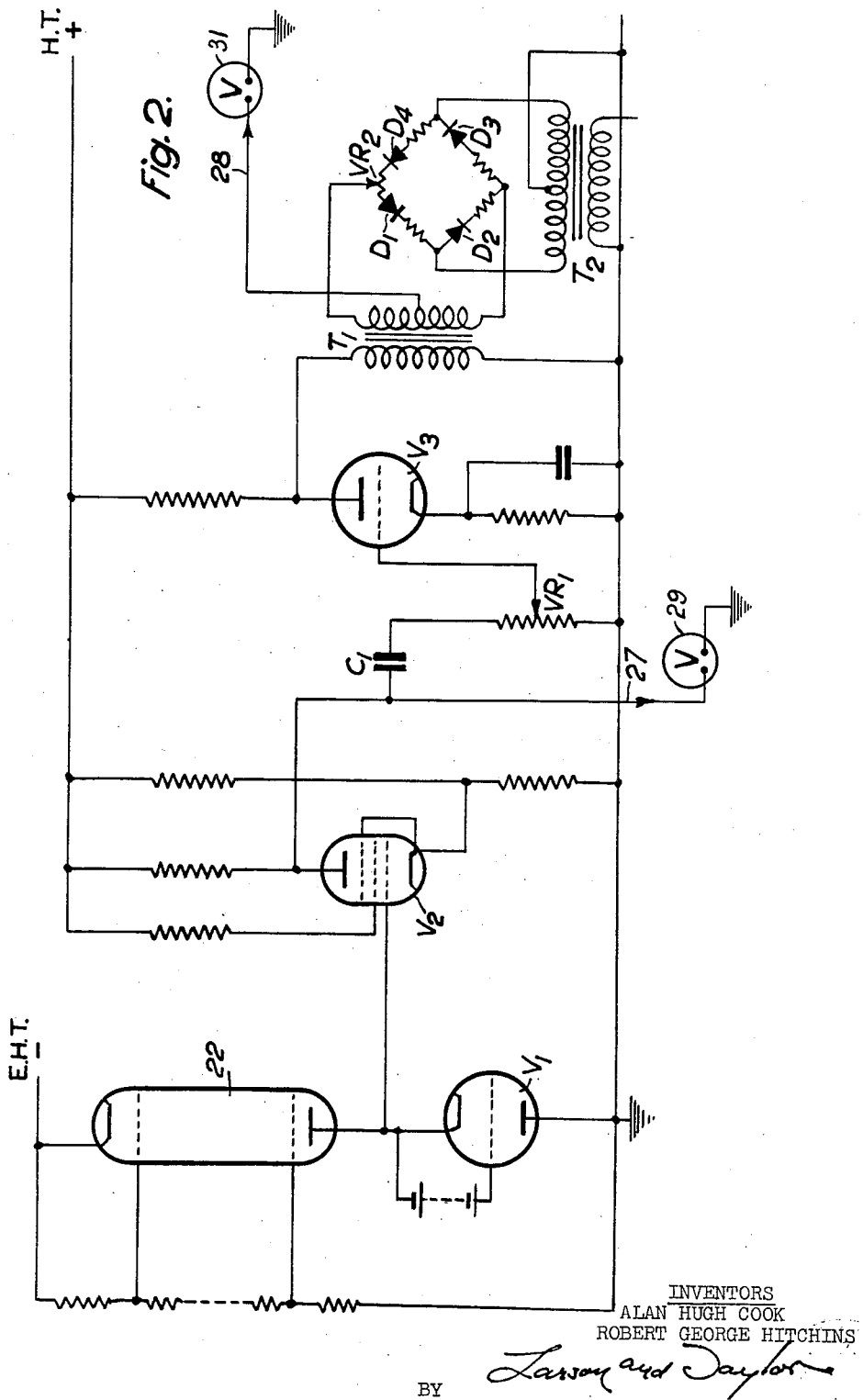

The invention will be further described with reference to the accompanying diagrammatic drawings in which FIGURE 1 illustrates the layout of the apparatus in the associated circuits in block form, while FIGURE 2 shows an actual circuit diagram which may be used.

A tool maker's microscope is not illustrated in the figures since this is a well known device and is in itself not part of the present invention. Briefly, it consists of a microscope and means controlled by a micrometer screw or the like for traversing the workpiece accurately along a path which keeps the observed part in focus. For long workpieces the microscope can usually be traversed by a carriage in relation to a stationary table while for short workpieces the microscope can remain stationary and the workpiece be traversed across the stage.

A slit on or in a suitable carrier 11 with means 12 for reciprocating it is mounted at one extreme end of a tube indicated at 13 fixed beneath the instrument. For convenience, the tube may be horizontally disposed. The slit may be a clear strip about 40 μm. wide and 0.2 mm. long scored upon an aluminised glass plate. Light from a suitable source indicated at 14 is concentrated upon it by a condenser lens system 15 and field lens 16 and at the other end of the tube 13 a well-corrected projection lens system 17 throws a reduced image of the slit, suitably 10μm. wide, upon the photographic plate 18 to be examined carried on the stage of the microscope which is provided with a micrometer feed screw indicated at 19. Since the microscope is usually arranged with its axis vertical while the tube 13 is arranged horizontally, a mirror 21 is introduced into the path of the beam to effect the necessary change in direction, but this relative disposition of the parts is a mere matter of convenience. For setting up the parts in alignment, the slit may be removed and the photographic image may be examined from above by the microscope itself. The slit may conveniently be reciprocated by mounting it on leaf spring or springs maintained in vibration by an electro-magnet the circuit of which the spring controls or by any usual construction of electro-magnetic or electrostatic vibrator. The frequency of vibration may be of the order of 150 c./s.; the best amplitude will depend upon the nature of the photographic image; it must be small in comparison with the width of the line under examination.

The photographic plate 18 may conveniently be held on the stage of the microscope by spring clips, and it can be traversed past the beam of light from the slit by the micrometer feed screw 19. If a very long plate is involved a microscope of the traversing carriage type may be used, in which case it will be understood that the beam forming system, slit and projection lens must also be mounted on the carriage. The traversing may be done step by step by hand or continuously by a small synchronous electric motor geared to the screw. When the necessary alignment has been effected, the microscope is removed and in its place there is mounted a photo-electric cell or preferably a photo-multiplier indicated at 22. This is arranged so that it can simply be inserted in place of the microscope and is then brought into correct alignment with the beam from the slit. An advantage of using a photomultiplier is that the output may be kept within the range of the measuring circuit employed by changing the number of dynodes and or the voltages applied to them. The photo-multiplier is shielded to prevent light other than that from the slit reaching it. The mounting which enables it to be substituted for the microscope may incorporate some or all of this shielding.

In so far as the current produced by the photo-multiplier 22 bears a linear relation to the light falling on it, the output of the photo-multiplier will be a current including a D.C. component approximately proportional to the mean value of the light passing through the area of the photographic plate scanned by the oscillating beam and therefore approximately proportional to the light falling upon the mid line of the area scanned, and an A.C. component due to the variation of transmitted light intensity over the scan, and therefore indicative of the density gradient.

To enable the density to be evaluated the output of the photo-multiplier 22 is fed to a logarithmic circuit 23, followed by a D.C. amplifier 24 when it can be shown that the voltage output of the amplifier is proportional to the density of the image. To evaluate the density gradient the output voltage of the amplifier 24 is also applied to a synchronous rectifier 25, the frequency of which is controlled from an oscillator 26 which also controls the electromagnetic vibrator 12 so that the rectifier acts in synchronism with the oscillations of the slit carrier 11. It can be shown then that the voltage output of the synchronous rectifier is proportional to the density gradient of the image. With such a scheme, if the traverse of the photographic plate is effected by motor drive and the voltmeters 29, 31 to which the respective output voltages of the amplifier 24 and rectifier 25 are applied are recording instruments, graphs of density and density gradient of the image can be quickly obtained.

FIGURE 1 only shows a block diagram but an actual circuit which may be used is shown in FIGURE 2.

The logarithmic amplifier includes a triode valve $V_1$ to the cathode of which flows the output current from the photo-multiplier 22. This triode works under retarding field conditions (see e.g. Review Sc. Inst. Vol. 10, 1939, p. 336). The potential difference between the anode and cathode of this valve is linearly related to the logarithm of the current through the valve i.e. of the light transmitted, over a certain range. Over this range therefore the potential difference is linearly related to the density of the image since the density is proportional to the logarithm of the light transmitted by the image.

The range over which the voltage-current characteristic of the logarithmic circuit is linear is limited by the condition that the potential of the cathode of valve $V_1$ must be positive with respect to the anode. It is for this reason that a photomultiplier is desirable because it can be adjusted so that this condition is satisfied. In a practical example this means that the output from the photomultiplier should be less than about 1 $\mu a$. At the same time, the current should not be too small or stray E.M.F.'s may affect the behaviour of the logarithmic circuit. By selecting the number of dynodes used and the voltages applied to them, the current can be adjusted to be as large as possible yet below the limiting value for a wide range of lengths and widths of slit.

The voltage developed across the valve $V_1$ is amplified by a D.C. amplifier constituted by the valve $V_2$. The mean value of this voltage is a measure of the mean density of the photograph and the zero of the scale is arbitrary. The D.C. voltage is applied to a voltmeter 29 through the line 27 while the alternating component passes through a condenser $C_1$ and a fraction selected by a potentiometer $VR_1$ is applied to the grid of another triode valve $V_3$ whereby it is amplified. The output of this valve is then rectified in a synchronous rectifier which is constituted by four germanium diodes $D_1, D_2, D_3, D_4$, each with a resistance in series connected to form a Wheatstone bridge circuit, all the diodes being set in the same direction round the network. The network is polarised by a reference voltage from the oscillator 26 of FIGURE 1. The signal voltage is supplied through a transformer $T_1$ and the reference voltage through a transformer $T_2$ and the secondaries of these two transformers are accurately-centre tapped so that balanced voltages are applied to the network. One side of the input is applied through a potentiometer $VR_2$ in the network so that adjustment may be made for inequalities in the impedance of the diodes. The steady voltage between the centre taps of the secondaries of the two transformers is then proportional to the first differential of the density of the photographic image, i.e. the density gradient of the image scanned by the oscillating beam and a voltmeter calibrated accordingly can be connected between these two centre taps or as shown, the one can be earthed and the line 28 from the other led to a voltmeter 31 having the other terminal earthed.

As above mentioned the voltmeters 29, 31 to which the lines 27 and 28 are connected may be recording instruments enabling graphs to be obtained if the image is traversed at a steady speed by motor drive. These instruments may also be arranged to record automatically the positions of the micrometer feed at which the density or density gradient attains specified values, for instance on cards or on paper tape.

What we claim is:

1. An instrument for ascertaining the density of a photographic image of a line comprising means for projecting a narrow beam of light upon the image, a photoelectric cell located to receive light from the image, the cell being one which provides an output bearing a linear relation to the light falling on it, means for oscillating the beam transversely in relation to the image with an amplitude that is small compared with the width of the image, a logarithmic circuit to which the alternating current output of the photoelectric cell is applied, a D.C. amplifier following the logarithmic circuit, a synchronous rectifier acting in synchronism with the oscillations of the beam to which the output of the amplifier is applied, means responsive to the voltage output of the synchronous rectifier, and means for relatively traversing the beam and the image transversely at a speed which is slow in relation to the oscillating motion of the beam.

2. An instrument according to claim 1 in which means responsive to the output voltage of the amplifier are provided to serve as a measure of the density of the image.

3. An instrument according to claim 1 in which the photoelectric cell is a photomultiplier.

References Cited in the file of this patent

UNITED STATES PATENTS

| | | |
|---|---|---|
| 2,489,305 | McLennan | Nov. 29, 1949 |
| 2,674,916 | Smith | Apr. 13, 1954 |
| 2,773,414 | Green | Dec. 11, 1956 |
| 2,848,921 | Koulikovitch | Aug. 26, 1958 |
| 2,880,512 | Fenemore et al. | Apr. 17, 1959 |
| 2,892,948 | Frantz | June 30, 1959 |